United States Patent
Golightly et al.

(10) Patent No.: US 12,067,043 B2
(45) Date of Patent: Aug. 20, 2024

(54) SYSTEMS AND METHODS FOR GENERATING PERSONALIZED POOLS OF CANDIDATE MEDIA ITEMS

(71) Applicant: Spotify AB, Stockholm (SE)

(72) Inventors: Michael Golightly, San Diego, CA (US); Kurt Jacobson, Stoneham, MA (US); Philip Glenny Edmonds, Boston, MA (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/860,015

(22) Filed: Jul. 7, 2022

(65) Prior Publication Data

US 2024/0012847 A1 Jan. 11, 2024

(51) Int. Cl.
*G06F 3/16* (2006.01)
*G06F 16/43* (2019.01)

(52) U.S. Cl.
CPC .............. *G06F 16/43* (2019.01); *G06F 3/165* (2013.01); *G06F 3/167* (2013.01)

(58) Field of Classification Search
CPC ........... G06F 16/43; G06F 3/165; G06F 3/167
See application file for complete search history.

(56) References Cited

U.S. PATENT DOCUMENTS

| | | | | |
|---|---|---|---|---|
| 11,050,806 B2 * | 6/2021 | Lewis | ................... | H04L 65/764 |
| 11,197,068 B1 * | 12/2021 | Patricks | ............. | H04N 21/8113 |
| 11,757,961 B2 * | 9/2023 | Shribman | .......... | H04N 21/8456 |
| | | | | 709/219 |
| 2014/0317099 A1 | 10/2014 | Jain et al. | | |
| 2015/0052168 A1 | 2/2015 | Sharifi | | |
| 2016/0147767 A1 * | 5/2016 | Manning | ............... | G06F 3/0482 |
| | | | | 715/716 |
| 2019/0042585 A1 | 2/2019 | Ploshykhyn | | |
| 2019/0236094 A1 * | 8/2019 | Sharifi | ............... | G06F 16/7834 |
| 2019/0361982 A1 | 11/2019 | Jacobson et al. | | |
| 2020/0278997 A1 * | 9/2020 | Lamere | ................. | G06F 16/632 |
| 2021/0200805 A1 * | 7/2021 | Wang | .................... | G06F 16/908 |
| 2021/0248173 A1 * | 8/2021 | Hansen | ............... | G06F 16/2457 |
| 2021/0399911 A1 * | 12/2021 | Jorasch | ............... | H04L 12/1822 |
| 2022/0100461 A1 * | 3/2022 | Bittner | ................... | H03G 5/165 |

* cited by examiner

*Primary Examiner* — Jorge A Casanova

(74) *Attorney, Agent, or Firm* — Morgan, Lewis & Bockius LLP

(57) ABSTRACT

An electronic device stores, for a user of a media-providing service, a playback history that includes information about media items that have previously been consumed by the user. The electronic device receives a request to search for media content including search criteria. In response to the request, and without additional user intervention, the electronic device generates a vector representation of the user using media items from the playback history of the user that are relevant to the search criteria. The electronic device identifies one or more media content items from a media content library that match the vector representation of the user and the search criteria and provides, to the user, the one or more media content items.

20 Claims, 6 Drawing Sheets

500

502 Store, for a user of a media-providing service, a playback history that includes information about media items that have previously been consumed by the user.

> 504 The playback history includes an indication of the media items that have previously been consumed by the user.

> 506 The playback history includes, for a respective media item of the media items that have previously been consumed by the user, user interaction data representing one or more interactions, from the user, that are received by the media-providing service while the respective media item is consumed by the user.
>
>> 508 The user interaction data is based on of one or more of: whether the user skipped playback of the media item within a predetermined time period, adjusted a volume of the media item, marked the media item as a favorite, added the media item to a playlist, and shared the media item.
>
>> 510 The user interaction data includes, for a respective media item, a positive indication value or a negative indication value.

> 512 The playback history includes a number of times the media item was consumed by the user.

> 514 The playback history includes an indication that the user repeated the media item.

FIG. 5A (A)

516 Receive a request to search for media content including search criteria.

*518 The request to search for media content includes one or more descriptors, or synonyms of the one or more descriptors. Identify the media items, from the playback history of the user, that are relevant to the one or more descriptors.*

*520 The request to search for media content comprises a voice command.*

522 In response to the request, and without additional user intervention, generate a vector representation of the user using media items from the playback history of the user that are relevant to the search criteria.

*524 The media items that are relevant to the search criteria comprise a subset, less than all, of the media items in the playback history of the user.*

526 Identify one or more media content items from a media content library that match the vector representation of the user and the search criteria.

*528 Identifying the one or more media content items that match the vector representation of the user and the search criteria comprises selecting the one or more media content items having vector representations that based on a vector distance to the vector representation of the user.*

530 Provide, to the user, the one or more media content items.

*532 Rank the one or more media content items from the media content library.*

FIG. 5B

SYSTEMS AND METHODS FOR GENERATING PERSONALIZED POOLS OF CANDIDATE MEDIA ITEMS

TECHNICAL FIELD

The disclosed embodiments relate generally to media provider systems, and, in particular, to identifying pools of candidate media items from which to draw personalized sets of media items to present to a user.

BACKGROUND

Recent years have shown a remarkable growth in consumption of digital goods such as digital music, movies, books, and podcasts, among many others. The overwhelmingly large number of these goods often makes navigation and discovery of new digital goods an extremely difficult task. To cope with the constantly growing complexity of navigating the large number of goods, users are enabled to search a library of content in order to quickly and easily access media items. Typically, search engines that are used to generate the results, e.g., in response to a user's search request, for a particular media item or type of media item, do not take into account the user's personal tastes when providing results for the user.

SUMMARY

A media content provider is enabled to store a playback history of a user in order to provide personalized recommendations and/or playlists for the user based on media items that the user has previously consumed. However, providing search results that are selected solely from a user's playback history limits the results without the ability to provide the user with access to new content that has not been previously consumed by the user. Similarly, providing generic search results without taking into account the user's preferences limits the search results and takes away from the user experience. Accordingly, there is a need for providing personalized recommendations to the user that includes both previously consumed and unconsumed media items.

In the disclosed embodiments, systems and methods are provided for generating a query (e.g., a faceted similarity search query) that includes (a) search criteria, and (b) a vector representation of the user's playback history that matches the search criteria. The system uses the query to identify media items from a content library, and presents the identified media items to the user as a search result and/or a sequence of media items provided to the user (e.g., a personalized playlist). In this way, the system first identifies relevant content in the user's playback history that matches the search criteria, before providing the relevant content (e.g., as a vector representation) and the search criteria to a search engine to search a library of content items. In some embodiments, the results of the search (e.g., the top 100 or top 1000 results) are then used as a pool from which to sequence media items (e.g., according to other criteria distinct, and in some cases, non-overlapping with) the search criteria. Thus, instead of presenting search results and/or a sequence of media items that only match the search criteria or that match the search criteria and an overall taste profile of the user, the search results are tailored to content items that match the search criteria and are similar to previously-consumed content items that also match the search criteria.

To that end, in accordance with some embodiments, a method is provided. The method includes storing, for a user of a media-providing service, a playback history that includes information about media items that have previously been consumed by the user. The method includes receiving a request to search for media content including search criteria. The method further includes, in response to the request, and without additional user intervention, generating a vector representation of the user using media items from the playback history of the user that are relevant to the search criteria. The method includes identifying one or more media content items from a media content library that match the vector representation of the user and the search criteria and providing, to the user, the one or more media content items.

In accordance with some embodiments, an electronic device is provided. The electronic device includes one or more processors and memory storing one or more programs. The one or more programs include instructions for performing any of the methods described herein.

In accordance with some embodiments, a non-transitory computer-readable storage medium is provided. The non-transitory computer-readable storage medium stores one or more programs for execution by an electronic device with one or more processors. The one or more programs comprising instructions for performing any of the methods described herein.

Thus, systems are provided with improved methods for enhancing a user-curated playlist.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 5A-5B are flow diagrams illustrating a method of providing personalized search results (e.g., for use as a pool of media items from which to generate a personalized sequence of media items), in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
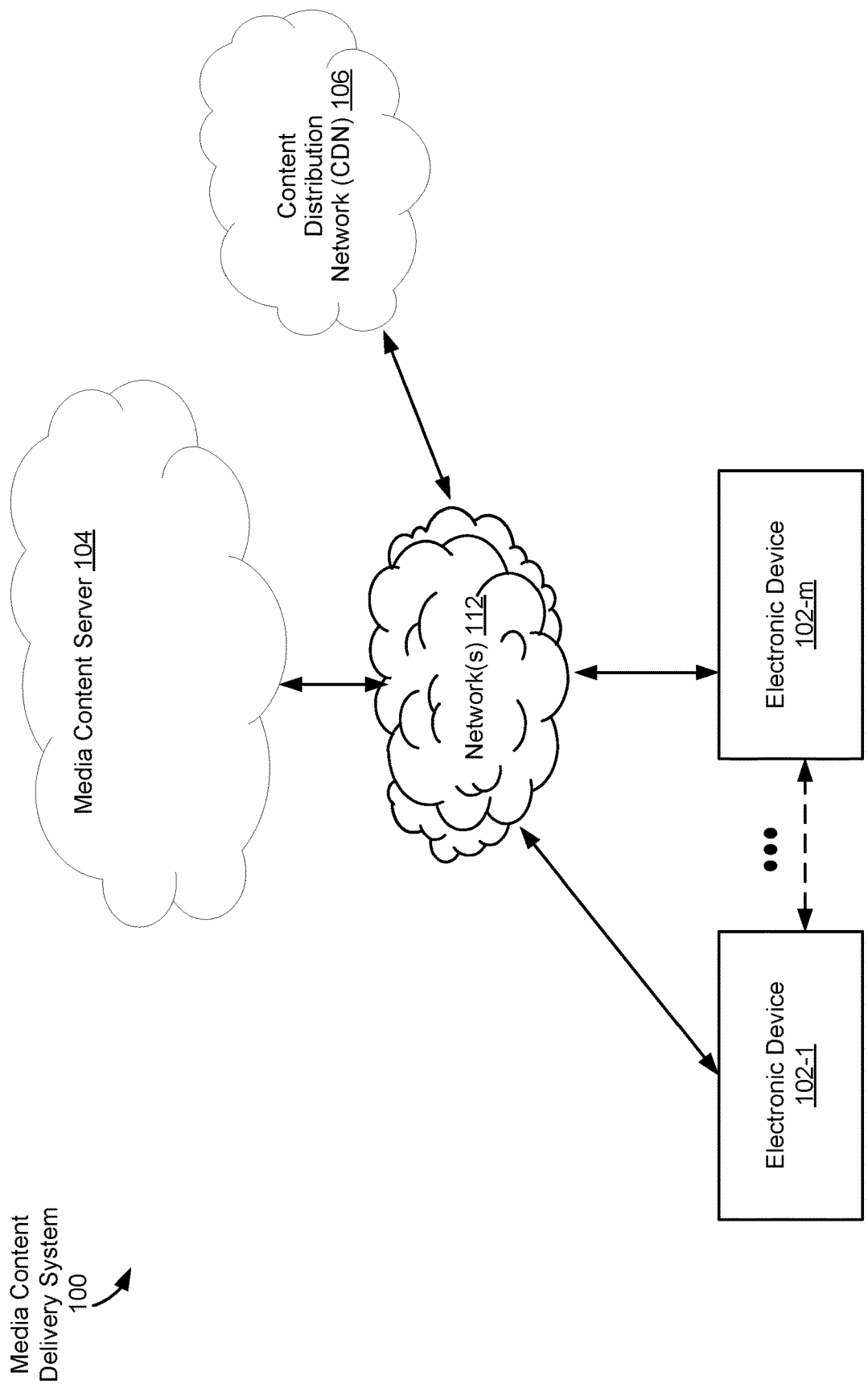
FIG. 1 is a block diagram illustrating a media content delivery system, in accordance with some embodiments.

FIG. 1 is a block diagram illustrating a media content delivery system 100, in accordance with some embodiments. The media content delivery system 100 includes one or more electronic devices 102 (e.g., electronic device 102-1 to electronic device 102-$m$, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, an infotainment system, digital media player, a speaker, television (TV), and/or any other electronic device capable of presenting media content (e.g., controlling playback of media items, such as music tracks, podcasts, videos, etc.). Electronic devices 102 may connect to each other wirelessly and/or through a wired connection (e.g., directly through an interface, such as an HDMI interface). In some embodiments, electronic devices 102-1 and 102-$m$ are the same type of device (e.g., electronic device 102-1 and electronic device 102-$m$ are both speakers). Alternatively, electronic device 102-1 and electronic device 102-$m$ include two or more different types of devices.

In some embodiments, electronic devices 102-1 and 102-$m$ send and receive media-control information through network(s) 112. For example, electronic devices 102-1 and 102-$m$ send media control requests (e.g., requests to play music, podcasts, movies, videos, or other media items, or playlists thereof) to media content server 104 through network(s) 112. Additionally, electronic devices 102-1 and 102-$m$, in some embodiments, also send indications of media content items to media content server 104 through network(s) 112. In some embodiments, the media content items are uploaded to electronic devices 102-1 and 102-$m$ before the electronic devices forward the media content items to media content server 104.

In some embodiments, electronic device 102-1 communicates directly with electronic device 102-$m$ (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-$m$. In some embodiments, electronic device 102-1 communicates with electronic device 102-$m$ through network(s) 112. In some embodiments, electronic device 102-1 uses the direct connection with electronic device 102-$m$ to stream content (e.g., data for media items) for playback on the electronic device 102-$m$.

In some embodiments, electronic device 102-1 and/or electronic device 102-$m$ include a media application 222 (FIG. 2) that allows a respective user of the respective electronic device to upload (e.g., to media content server 104), browse, request (e.g., for playback at the electronic device 102), and/or present media content (e.g., control playback of music tracks, playlists, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API, a connect API, and/or key service. In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
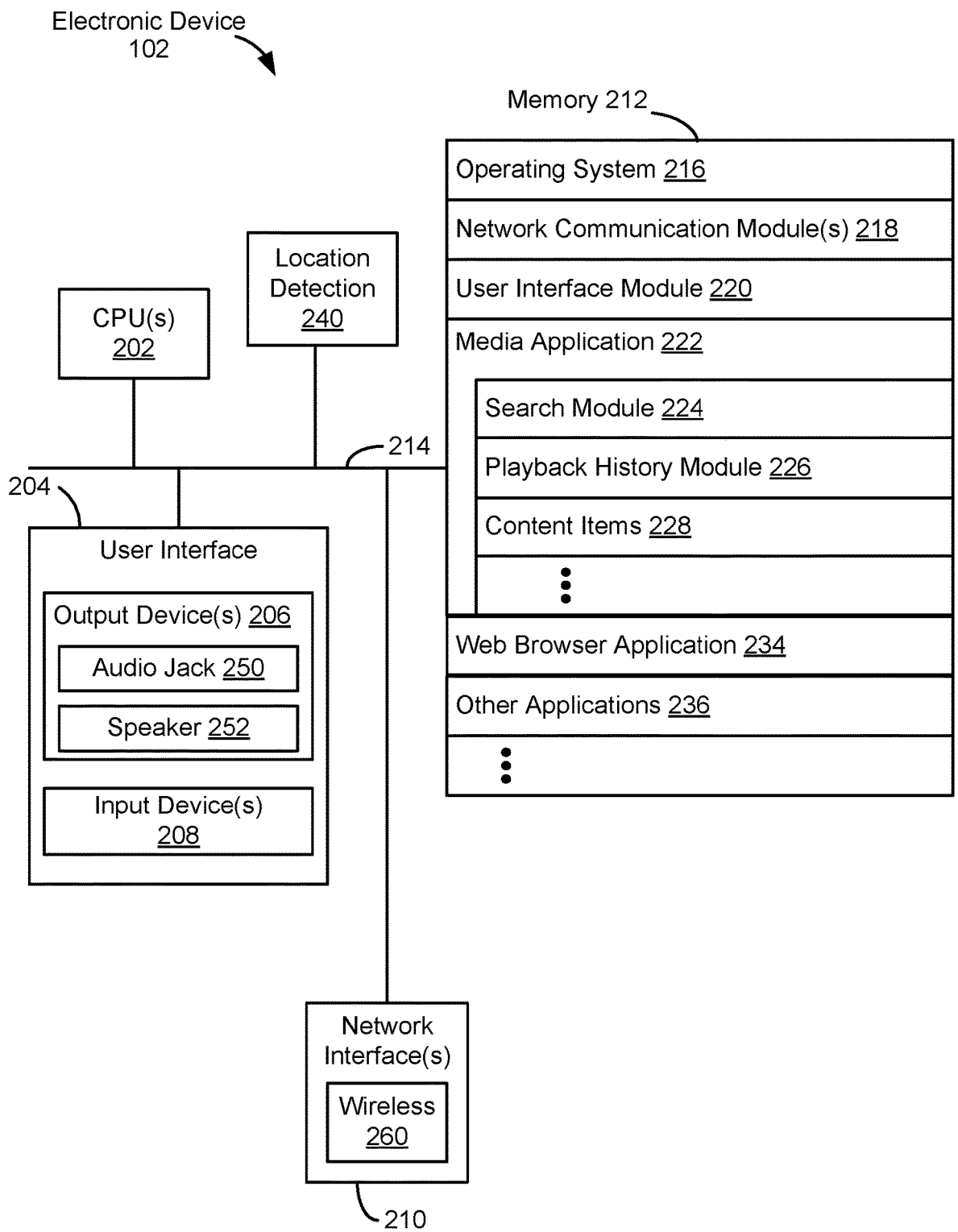
FIG. 2 is a block diagram illustrating an electronic device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems, and/or or other wireless (e.g., Bluetooth-compatible) devices (e.g., for streaming audio data to the media presentations system of an automobile). Furthermore, in some embodiments, the wireless interface 260 (or a different communications interface of the one or more network interfaces 210) enables data communications with other WLAN-compatible devices (e.g., a media presentations system) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

an operating system 216 that includes procedures for handling various basic system services and for performing hardware-dependent tasks;

network communication module(s) 218 for connecting the client device 102 to other computing devices (e.g., media presentation system(s), media content server 104, and/or other client devices) via the one or more network interface(s) 210 (wired or wireless) connected to one or more network(s) 112;

a user interface module 220 that receives commands and/or inputs from a user via the user interface 204

(e.g., from the input devices 208) and provides outputs for playback and/or display on the user interface 204 (e.g., the output devices 206);

a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:

a search module 224 for receiving and/or processing a search request from a user, including textual search requests and/or voice search requests. In some embodiments, search module 224 forwards a search request to search module 320 at server 104. In some embodiments, search module 224 optionally includes recommendation system 402 and performs the methods described with reference to FIG. 4;

a playback history module 226 for detecting and/or storing user interactions with media content items, and optionally storing indications of media content items that have been consumed by the user. In some embodiments, playback history module 226 detects user interactions and reports the user interactions and indications of the consumed media items to server 104, wherein the playback history (e.g., database) is stored at electronic device 102 and/or server 104;

a content items module 228 for storing media items, including audio items such as podcasts and songs, for playback and/or for forwarding requests for media content items to the media content server;

a web browser application 234 for accessing, viewing, and interacting with web sites; and other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
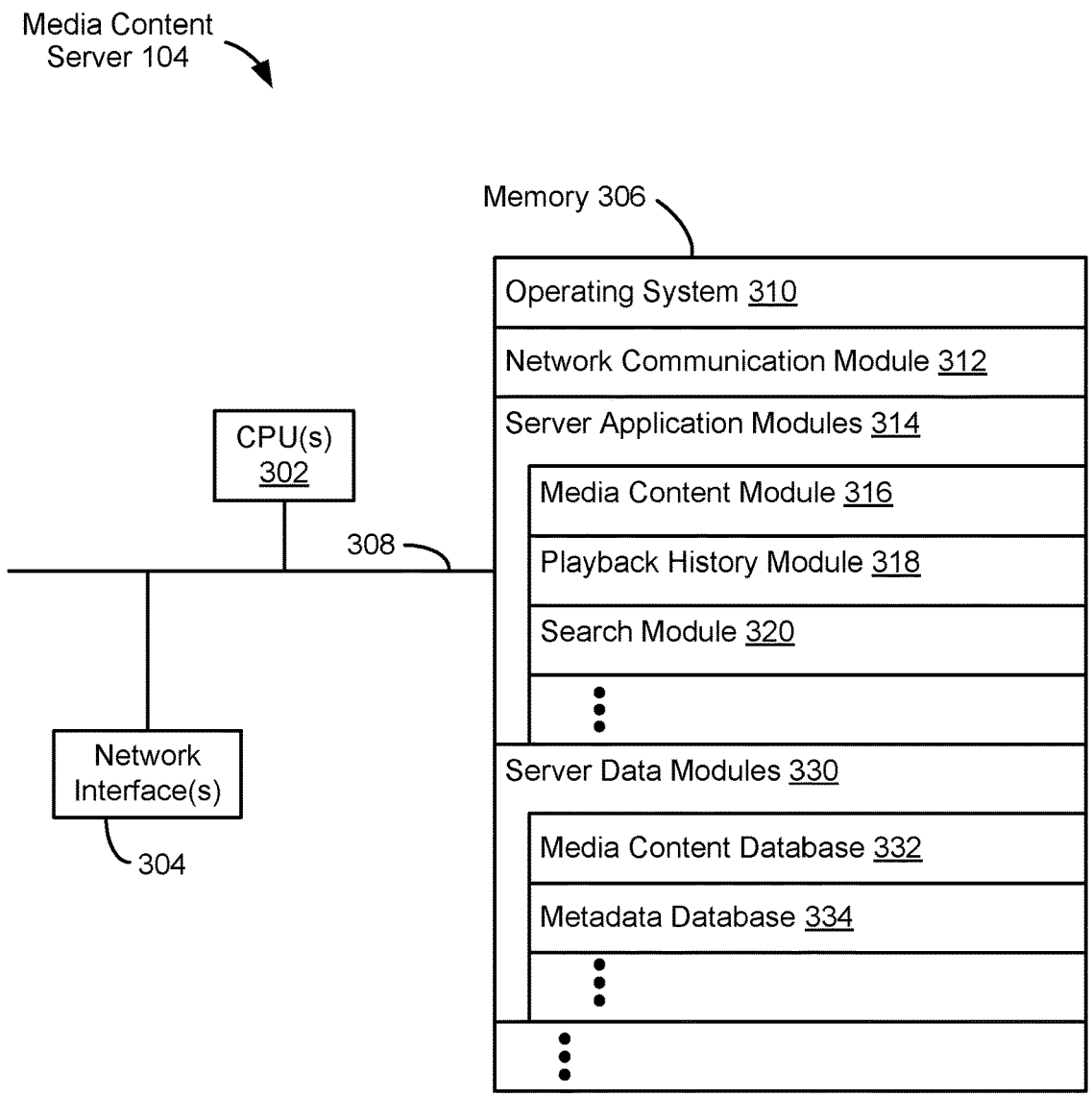
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

an operating system 310 that includes procedures for handling various basic system services and for performing hardware-dependent tasks;

a network communication module 312 that is used for connecting the media content server 104 to other computing devices via one or more network interfaces 304 (wired or wireless) connected to one or more networks 112;

one or more server application modules 314 for performing various functions with respect to providing and managing a content service, the server application modules 314 including, but not limited to, one or more of:

a media content module 316 for storing one or more media content items and/or sending (e.g., streaming), to the electronic device, one or more requested media content item(s);

a playback history module 318 detecting and/or storing user interactions with media content items in a playback history (e.g., database), and storing indications of media content items that have been consumed by the user in the playback history;

a search module 320 for determining and/or providing recommended search results in response to a search request from the electronic device. In some embodiments, search module 320 includes recommendation system 402 and performs the methods described with reference to FIG. 4;

one or more server data module(s) 330 for handling the storage of and/or access to media items and/or metadata relating to the media items; in some embodiments, the one or more server data module(s) 330 include:

a media content database 332 for storing media items; and a metadata database 334 for storing metadata relating to the media items, including a genre associated with the respective media items.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein.

In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4:
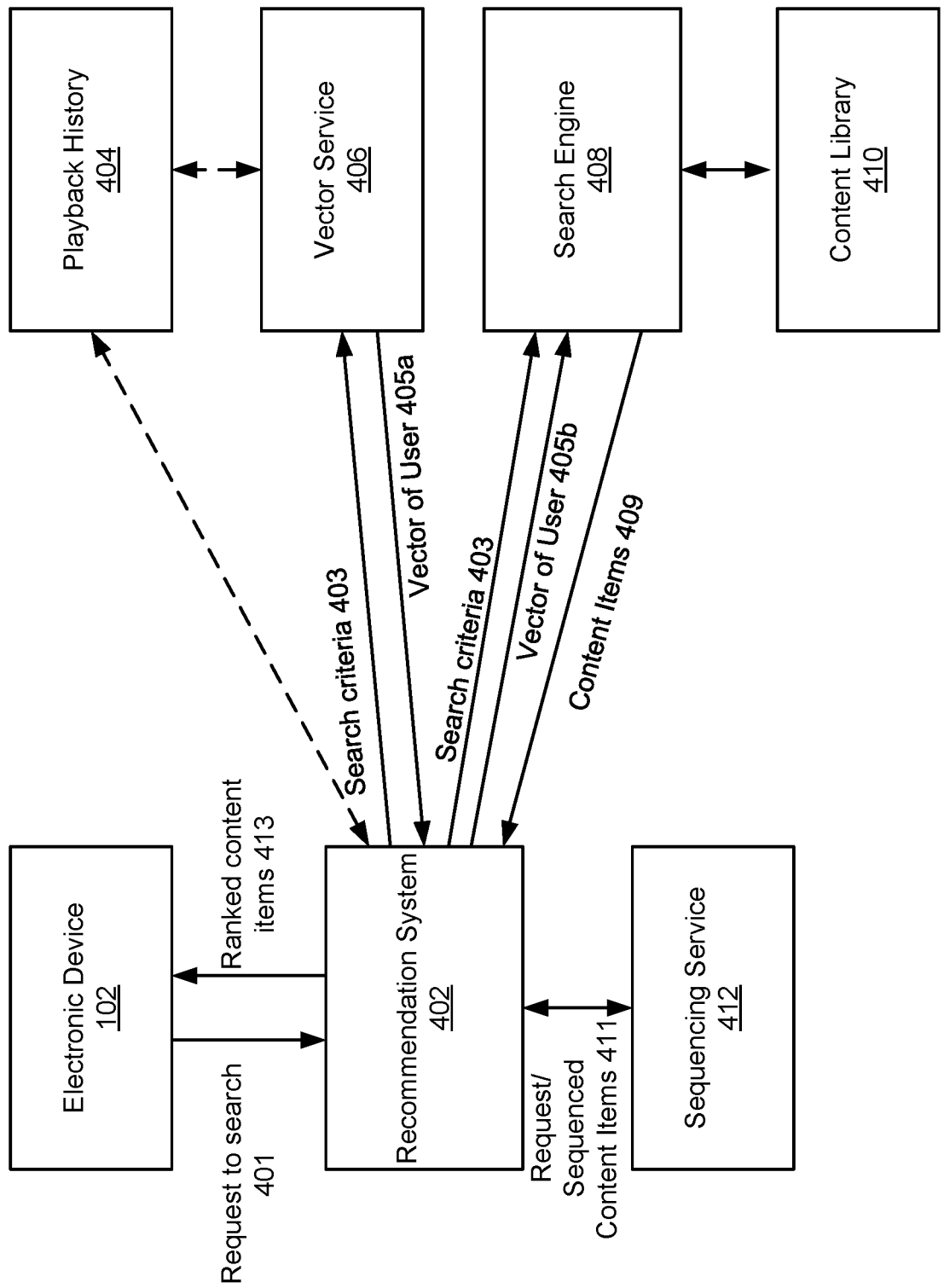
FIG. 4 is a block diagram illustrating a system for providing search results in response to a user request (e.g., for use as a pool of media items from which to generate a personalized sequence of media items), in accordance with some embodiments.

FIG. 4 is a block diagram illustrating a system for processing a search request in accordance with some embodiments. In some embodiments, the system (e.g., recommendation system 402, playback history 404, vector service 406, search engine 408, content library 410, and/or sequencing service 412) is implemented on a server system of the media-providing service. In some embodiments, portions of the system illustrated in FIG. 4 are implemented on electronic device 102.

In some embodiments, an application for the media-providing service executes on electronic device 102. For example, a user of electronic device 102 uses the application to request and control playback of media content items provided by the media-providing service. In some embodiments, the media-providing service processes requests that are received at the electronic device 102.

In some embodiments, as described herein, the system generates personalized results for a search by combining a search request (e.g., search criteria) with information about the user. The search requests (or at least the search criteria for the search request), in various circumstances, originate with the user or elsewhere (e.g., from a separate microservice within the media-providing service). As an example of the former, in some embodiments, a user of electronic device 102 is enabled to request to search 401 for media content to be provided by the media-providing service. In some embodiments, the request to search 401 is a voice command (e.g., using a virtual assistant), or a text command (e.g., input in a search box displayed in the application of the media-providing service).

As an example of the latter, in some embodiments, electronic device 102 displays (e.g., in the application for the media-providing service) a plurality of user-selectable options (e.g., recommended playlists). Each user-selectable option has a descriptor generated by the media-providing service (e.g., a playlist title). In this example, the request to search 401 comprises a user-selection of a respective user-selectable option. Alternatively, in some embodiments, the search is performed automatically by the media providing service before the user selects the respective user-selectable option. For example, in some embodiments, a microservice of the media-providing service curates a personalized recommended playlist for the user (e.g., "Summer Hits") by performing a faceted similarity search, as described herein, and provides the fully-populated and personalized recommended playlist to the user as one of the plurality of user-selectable options. The request to search 401 in such circumstances originates with the microservice as part of curating the personalized playlist.

In some embodiments, the request to search 401 is a request to search for a particular genre, playlist, artist, podcast, or other media content item (or set of media content items). In some embodiments, request to search 401 includes one or more descriptor terms, and optionally includes a time period. For example, request to search 401 includes a descriptor of a mood (e.g., "happy music" or "sad music"), a descriptor of an activity or event (e.g., "party music" or "exercise music" or "Women's History Month music"), a descriptor of a genre ("classic rock" or "jazz") and/or a descriptor of a time period (e.g., "80's hits" or "90's hip-hop").

In some embodiments, the request 401 to search may take the form of a request to play music associated with the descriptors. For example, the user may ask the electronic device 102 to "Play some happy music" or "Play 90's hip-hop". Note, further, that the request to play music associated with the descriptors need not take any express form. For example, a user may utter a voice command, "Help me relax." When the voice command is received by the media-providing service, it is interpreted as a request to search for and provide relaxing media items. The embodiments described herein create a "candidate pool" of media items that fit the search/request and which can then be sequenced according to other objectives and criteria.

Moreover, although some embodiments are described in this document with reference to a user initiated search and/or request for a certain type of media item, in other embodiments, the search and/or request is generated by an internal module of the media-providing service without user intervention or knowledge. For example, the media-providing service may provide a variety of recommended playlists to the user, including a "Relaxing Sunday Mornings" playlist and a "Get Pumped" playlist for exercise. The "Relaxing Sunday Mornings" playlist and a "Get Pumped" playlist are each generated by a separate module which requests a candidate pool from the recommendation system 402 (e.g., the equivalent of a user's search) and communicates with sequencing service 412 to produce the respective playlist. More generally, the principles described in the present disclosure may be used in any situation that would benefit from a candidate pool of media items that is generated 1) according to specified "search criteria" (e.g., metadata tags for the media items) and 2) personalized to the user. For example, the disclosed embodiments may be used in response to a user's voice command to "Play something different," in which case the media-providing service provides (without user intervention) search criteria according to a content recommendation hypothesis, and the system produces a personalized pool of candidate items according to the content recommendation hypothesis and the user's playback history, as described below.

In some embodiments, recommendation system 402 receives the request to search 401 and, in response to the request, determines one or more search criteria 403 associated with the request to search. In some embodiments, the one or more search criteria 403 are determined by parsing (e.g., using natural language processing) a request to search 401 received from the user. For example, in response to a request to "Play 90's hip-hop", the recommendation system 402 determines one or more criteria for the search, including one or more descriptors (e.g., including synonyms of the search request), such as "hip-hop" (and/or synonyms of "hip-hop") and criteria for being associated between the years 1990-1999. In some embodiments, the search criteria 403 are selected to match one or more tags of media content items. For example, media content items in playback history 404 and/or in content library 410 are stored with (e.g., associated with) one or more tags that describe the media content item. In some embodiments, the tags correspond to an identified genre, an identified mood, an identified tempo, and/or other identified features of the respective media content item.

In some embodiments, after determining search criteria 403, the recommendation system 403 sends the search criteria 403 to vector service 406. In some embodiments, vector service 406 accesses playback history 404 of the user from whom the candidate pool will be generated (e.g., the user that initiated the request to search 401, and/or the user from whom a personalized playlist is being constructed). Playback history 404 includes indications of media content items that have been previously consumed by the user (using the media-providing service) and/or indications of media items that the user has interacted with (e.g., even if the user has not consumed the media item), such as liked songs or disliked media items (e.g., indicated by a user-selectable affordance for liking and/or disliking a media item) or another type of interaction (and thus are referred to herein as "interaction data"). In some embodiments, playback history 404 includes a positive and/or negative (or neutral) indicator value for each media content item in the playback history. For example, user interactions during playback of a respective media content item are stored and/or analyzed to determine whether the user has an affinity for the media content item. For example, a user that consumes playback of an entire media content item (e.g., or marks the media content item as a favorite) is assigned a positive indicator value, while a user that skips (or interrupts) playback of a media content item is assigned a negative indicator value (e.g., the user does not have an affinity for the media content item). In some embodiments, the playback history 404 includes previously-consumed media content items within a rolling time window, for example, includes the past 30-days of playback history or the past year of playback history. In some embodiments, the playback history 404 includes all of the playback history since the initial playback session the user activated using the media-providing service.

In some embodiments, the recommendation system 402 optionally accesses playback history 404 of the user and forwards information (e.g., the playback history) to vector service 406 (e.g., as opposed to vector service 406 directly accessing playback history 404).

In some embodiments, as described below, the recommendation system 402 uses a faceted similarity search to retrieve results. In some embodiments, vector service 406 identifies media content items in the playback history 404 that match the search criteria 403. In some embodiments, each of the media content items in the playback history 404 is represented by a vector representation. In some embodiments, the respective vector representation of the media content item corresponds to a genre, tempo, mood, danceability, or other feature of the media content item. In some embodiments, the respective vector representation of the media content item is produced by a machine learning model (e.g., a neural network) trained to produce similar vectors for similar media items. In some embodiments, the vector service 406 obtains (or generates) the vector representations for media content items that are tagged with a tag that matches at least one descriptor defined in search criteria 403 (e.g., by performing a faceted similarity search). For example, vector service 406 obtains (or generates) a vector representation for song A if song A is tagged with "hip-hop" and/or is tagged with a date between 1990-1999, but does not obtain the vector representation for song B if song B is not tagged with "hip-hop" (or a synonym) and/or is not tagged with a date between 1990-1999. For example, the vector service 406 identifies media content items in the playback history 404 that are tagged with the descriptor "hip-hop" or synonyms of "hip-hop" that are also tagged with a year that is between the years 1990-1999. In some embodiments, vector service 406 obtains a respective media item that matches at least one of the criteria (e.g., "hip-hop" or between 1990-1999). In some embodiments, vector service 406 obtains a respective media item that matches both the descriptor and the timing criteria (e.g., "hip-hop" and between 1990-1999). In some embodiments, vector service 406 obtains the matching media content items from playback 404, and generates the respective vector representations for each media content item.

In some embodiments, using the identified media content items (e.g., the vectors of the identified media content items) from the playback history 404 that are relevant to the search criteria 403 (e.g., using only those media items), the vector service 406 generates a vector that represents the user 405a (e.g., with respect to the search criteria) (e.g., by averaging or otherwise combining the vectors of the media content items that are identified from the playback history 404 as being relevant to the search criteria). As such, vector of user 405a represents a combination of media content items that the user has previously consumed (and are stored in playback history 404) that also match the search criteria (e.g., vector of user 405a represents media content items that the user tends to listen to that also match search criteria 403). Thus, in some embodiments, different vectors are generated for different queries (e.g., different search requests, or playback requests) for the same user.

Vector service 406 is thus enabled to generate a vector of the user that is relevant to search criteria 403, instead of providing a generic vector representation of the user's overall playback history. For example, without considering search criteria 403, vector service 406 would generate a vector representation of the user's taste profile, including a user's taste for content items that are not related to the search criteria 403. Using an overall vector representation of the user's taste profile can lead to a skewed search result, because a user's affinity (e.g., as determined by the user's consumption stored in playback history 404) of certain media items can, in effect, cancel out the user's affinity for other media items. The disclosed embodiments address this problem by only retrieving media content items from playback history 404 that are also relevant to search criteria 403. Thus, the vector representation measures the user's affinity for content items that relate to the search, as opposed to the user's overall affinity for any (e.g., all) types of content items.

In some embodiments, the vector that represents the user 405a (e.g., that represents the user's playback history of media items that match the search criteria 403) is sent to recommendation system 402. In some embodiments, recommendation system 402 forwards the vector of the user 405b (e.g., equivalent to vector of the user 405a) and the search criteria 403 to a search engine 408. In some embodiments, vector of the user 405b and search criteria 403 are sent to search engine 408 as separate messages, or are optionally combined into a single message (also referred to herein as a query) that is sent to search engine 408. For example, the vector of the user 405a and the search criteria 403 are concatenated into a single query that is sent to search engine 408. In some embodiments, recommendation system 402 forwards at least a portion of the playback history 404 to search engine 408. For example, search engine 408 uses the playback history 404 to generate weights for respective media items that are included in the results.

In some embodiments, search engine 408 (e.g., Elasticsearch or another search index) retrieves results from a content library 410 that satisfies the message (e.g., query) that includes the search criteria 403 and vector of the user 405*b*. In some embodiments, retrieving results from the content library 410 include scoring media items in the content library 410 and selecting media items based on their respective scores (e.g., that are optionally based at least in part on playback history 404). In some embodiments, a predefined number (e.g., 50, 100, 500, 1000) media items are selected (e.g., the top 50, 100, 500, 1000 media items). In some embodiments, the results include a weight for each media item in the results. In some embodiments, the search engine 408 adds additional metadata to the returned search results, wherein the additional metadata is personalized to the user (e.g., values or Boolean flags representing familiarity of the user with the respective media item (e.g., as determined by playback history 404)). Such metadata is referred to herein as "decorations" and may be used by sequencing service 412.

In some embodiments, media items having corresponding scores above a predefined threshold are selected (e.g., all media items scoring above the predefined threshold are selected, regardless of how many media items that is). In some embodiments, content library 410 includes a library of content provided by the media-providing service. For example, the playback history 404 of the user includes a subset, less than all, of the media content items in the content library 410 (e.g., playback history 404 includes media content items in the content library 410 that have been consumed by the user, but does not include media content items in the content library 410 that have not been previously consumed by the user).

Thus, search engine 408 is not limited to searching for content item results that the user has previously consumed (e.g., and are stored in playback history 404), and instead performs a search (e.g., a faceted similarity search), using vector of the user 405*b* and search criteria 403, of content library 410. Accordingly, the identified content items 409 (from content library 410) satisfy the search criteria and are biased towards features of media content items in playback history 404, which both satisfy the search criteria and have been previously consumed by the user.

In some embodiments, the identified content items 409 are provided to the user in a ranked order based solely on the search request, as modified by information from a profile and/or listening history of the user (e.g., ranked by score, as described above).

Alternatively, in some embodiments, content items 409 are forwarded from recommendation system 402 to a sequencing service 412, with a request 411 to sequence the content items 409. Sequencing service 412 optionally sequences the content items 409 according to objectives and/or criteria independent of the vector of the user 405*a* and the respective vector representation of the respective content item in content items 409 (or the original search query). In some embodiments, sequencing service 412 sequences the content items based at least in part on the weights and/or decorations received from the search engine 408 (e.g., as determined based on the playback history 404). In some embodiments, the vector of the user 405*a* and the respective vector representation of the respective content item in content items 409 (or the original search query) are not used in sequencing the media items. Thus, the vector of the user 405*a* and the respective vector representation of the respective content item in content items 409 are only used to create a candidate pool of media items that is subsequently sequenced. In some embodiments, the objectives and/or criteria used to sequence the content items relate to information and/or parameters stored in the user's profile. For example, the sequencing service 412 may attempt to provide a sequence of items that meets an objective that 70% of the sequenced media items are familiar to the user (e.g., media items that the user has previously consumed, or at least media items from artist that the user has previously consumed) and 30% of the media items qualify as "discovery" (e.g., media items that are likely to be unfamiliar to the user). The sequencing service may also attempt to provide a sequence of media items that meet particular criteria (e.g., to avoid providing consecutive tracks by the same artist). Note that the objectives and/or criteria used for sequencing the items may be provided by a separate service, and that the sequencing service 412 may use different sequencing objectives and/or criteria for different services (e.g., different sequencing objective and/or criteria for a "Relaxing Sunday Morning" playlist as compared to a "Get Pumped" playlist).

In some embodiments, the sequenced content items 413 are passed back to the electronic device 102 for playback. In some embodiments, the sequenced content items 413 are displayed in the application of the media-providing service, for example, in a playlist. In some embodiments, the sequenced content items 413 are presented in a search user interface as search results in response to the request to search 401.

Accordingly, in response to the user's request to search 401, the electronic device 102 receives a customized list of sequenced content items that takes into account the playback history 404 of the user, wherein the sequenced content items are presented in an order that is most likely to match the objectives and criteria specified to the sequencing service 412.

FIGS. 5A-5B are flow diagrams illustrating a method 500 of, in response to a user's search request, providing media content items that are tailored to the user, in accordance with some embodiments. In some embodiments, method 500 generates a pool of candidate items based on a search request (e.g., provided by a user or a separate module of the media-providing service). As noted above, a user-provided search request need not take any particular form, and thus does not need to take the form of a traditional search request. For example, a user may utter a voice command to "Help me relax" or "Play 90s hip-hop," both of which would be interpreted as requests to search for and provide appropriate media items that fit the user's request. In some embodiments, the method 500 determines a set of media items based on the request, as modified by information from a profile and/or listening history of the user. In some embodiments, the set of media items are provided to the user in a ranked order based solely on the search request, as modified by information from the profile and/or listening history of the user. Alternatively, in some embodiments, the set of media items are used as a personalized pool of candidate media items, which can then be sequenced according to other objectives and constraints (e.g., an objective to provide 70% familiar media items and 30% media items that are likely to be new to the user; a constraint to avoid providing consecutive media items by the same artist; an objective to promote certain artists). The sequenced media items are then provided to the user in the determined sequence.

Method 500 may be performed at an electronic device (e.g., media content server 104 and/or electronic device(s) 102) having one or more processors and memory storing instructions for execution by the one or more processors. In some embodiments, the method 500 is performed by executing instructions stored in the memory (e.g., memory 212, FIG. 2, memory 306, FIG. 3) of the electronic device. In some embodiments, the method 500 is performed by a combination of the server system (e.g., including media content server 104 and CDN 106) and a client device.

Referring now to FIG. 5A, in performing the method 500, the electronic device stores (502), for a user of a media-providing service, a playback history that includes information about media items that have previously been consumed by the user. For example, playback history 404 is stored for the user.

In some embodiments, the playback history includes (504) an indication of the media items that have previously been consumed by the user. In some embodiments, the indication is a title, an artist, an album, and/or a playlist associated with the respective media item. For example, playback history 404 includes a respective indication of each media item in playback history 404 that identifies the media items that have been previously consumed by the user. In some embodiments, the playback history includes media items that have been previously consumed by the user within a predefined time period (e.g., within a rolling time window), such as within the past day, week, month, year, etc.

In some embodiments, the playback history includes (506), for a respective media item of the media items that have previously been consumed by the user, user interaction data representing one or more interactions, from the user, that are received by the media-providing service while the respective media item is consumed by the user. For example, playback history 404 includes indications of whether the user completed playback of a respective media item (e.g., or skipped playback of the media item before completion). As such, playback history 404 includes information that is used to derive a user's listening habits and/or taste, for example wherein a media item that is repeatedly consumed by the user corresponds to an indication that the user likes the media item. In some embodiments, aggregating the user's listening habits, as indicated by the playback history 404 of the user, enables the media-providing service to provide personalized recommendations to the user based on the user's prior media content consumption.

In some embodiments, the user interaction data is (508) based on of one or more of: whether the user skipped playback of the media item within a predetermined time period, adjusted a volume of the media item, marked the media item as a favorite, added the media item to a playlist, and shared the media item. For example, if a user skips the media item after consuming it for less than 30 seconds, this is marked as a negative indication, and if the user marks the media item as a favorite, this is marked as a positive indication for the media item. In some embodiments, adjusting a volume up, marking the media item as a favorite, adding the media item to a playlist and/or sharing the media item correspond to positive indication values. In some embodiments, each of these positive interactions is used as a weight to increase a positive indication value (or decrease a negative indication value) of the media item. In some embodiments, adjusting a volume down, and skipping playback within a predetermined time period (e.g., within 5 seconds, within 30 seconds, or before halfway through the media item) correspond to negative indication values, wherein each of these negative interactions is used as a weight to increase a negative indication value (or decrease a positive indication value) of the media item.

In some embodiments, the user interaction data includes (510), for a respective media item, a positive indication value or a negative indication value. In some embodiments, each media item or interaction with the media item is assigned a positive or negative weight, wherein positive represents the user liking the media item and negative represents the user disliking the media item. For example, additional positive user interactions results in a larger positive indication value (the user's favorite media items will have the largest positive indication values).

In some embodiments, the playback history includes (512) a number of times the media item was consumed by the user. In some embodiments, a larger number times the media item was consumed by the user indicates a most positive indication value.

In some embodiments, the playback history includes (514) an indication that the user repeated the media item.

The electronic device receives (516) a request to search for media content including search criteria. In some embodiments, the request to search is received from the user. In some embodiments, the request to search is received from a module of the media-providing service (e.g., a module tasked with providing a certain type of personalized playlist for the user). In some embodiments, the request to search is received for the specific user (e.g., and identifies the specific user). For example, as described with reference to FIG. 4, request to search 401 is received at recommendation system 402 from the user of the media-providing service. In some embodiments, request to search 401 includes search criteria 403. In some embodiment, recommendation system 402 determines search criteria 403 using request to search 401 (e.g., search criteria 403 includes synonyms of descriptors that are not explicitly included in request to search 401).

In some embodiments, the request to search for media content includes (518) one or more descriptors, or synonyms of the one or more descriptors. In some embodiments, the electronic device identifies the media items, from the playback history of the user, that are relevant to the one or more descriptors, as described with reference to FIG. 4. In some embodiments, the media items in the playback history of the user are tagged with the one or more descriptors, such that a request to search that includes a respective descriptor, or a synonym of the respective descriptor, filters the media items in the playback history 404 to only include media items that are tagged with the descriptor.

In some embodiments, the request to search for media content comprises (520) a voice command. For example, request to search 401 is a voice command detected by electronic device 102. In some embodiments, the request to search for media content comprises a text search (e.g., that includes one or more descriptors). In some embodiments, the request to search for media content comprises selection of a user interface object that displays a recommended media content item (e.g., a button that displays "90's Hip-Hop"), wherein the recommended media content item has a corresponding descriptor (e.g., playlist title) that is used as the search criteria.

In response to the request, and without additional user intervention, the electronic device generates (522) a vector representation of the user using media items from the playback history of the user that are relevant to the search criteria. Alternatively, in some embodiments, the electronic device generates a vector representation of the user using media items from the playback history of the user (e.g., and other information from the user's profile, such as the user's preferences) that does not take into account the search criteria (e.g., the vector for the user is not based on the search criteria). In some embodiments, the system builds a personalized query that takes into account not only the direct query (e.g., the request to search 401), but also the individual user's profile (e.g., using the playback history 404 of the user). For example, the tracks returned for the query "1990's Hip Hop" will return a different pool of candidates (e.g., media content items) for a user with a high affinity for a first artist, than it would for a user with high affinity for second artist different from the first artist. In some embodiments, as described with reference to FIG. 4, the vector representation is indicative of the user's playback history within (e.g., limited to) a content domain that is defined by the search criteria (e.g., search criteria 403). For example, as described with reference to FIG. 4, vector service 406 generates a vector of user 405*a* that is based on search criteria 403 and the playback history 404 of the user.

In some embodiments, the media items that are relevant to the search criteria comprise (524) a subset, less than all, of the media items in the playback history of the user. For example, the user has consumed a plurality of genres, as indicated by the media items stored in playback history 404 for the user. Vector service 406 identifies a subset of the media items in the playback history 404, wherein the subset of media items match (e.g., satisfy) search criteria 403. For example, if the request to search is for "hip-hop" and search criteria 403 includes the descriptor "hip-hop" and synonyms of hip-hop, media items that are not tagged with the descriptor "hip-hop" (or a synonym) are not included in the subset of the media items (e.g., a media item tagged with a descriptor of "classical" is not included in the subset). Thus, vector service 406 generates a vector 405*a* that represents a subset, less than all, of the playback history 404 of the user, wherein the media items in the subset matches search criteria 403.

In some embodiments, the electronic device optionally generates a query that includes the search criteria and the generated vector representation of the user. For example, search criteria 403 and vector of user 405*b* are optionally combined (e.g., concatenated) into a single query that is sent to search engine 408 for identifying (e.g., searching) media content items in content library 410 that match the query. In some embodiments, the query is a faceted similarity search query or a semantic search query used to search the content library 410.

The electronic device identifies (526) one or more media content items from a media content library (e.g., using search engine 408, FIG. 4). In some embodiments, the one or more media content items from the media content library (e.g., content library 410, FIG. 4), are not necessarily in the playback history of the user (e.g., playback history 404, FIG. 4). The one or more media content items are selected in accordance with a determination that the one or more media content items match the vector representation of the user and the search criteria. In some embodiments, the one or more media content items have not been previously consumed by the user (e.g., are distinct from the media items from the playback history of the user that are relevant to the search criteria). In some embodiments, content library 410 includes media items that are in the playback history 404 of the user and media items that are not in the playback history 404 of the user. As such, content items 409 may include one or more media items that are in the playback history 404 (and content library 410) and one or more media items that are not in the playback history 404 (but are in content library 410).

In some embodiments, identifying the one or more media content items that match the query comprises (528) selecting the one or more media content items having vector representations that based on a vector distance (e.g., cosine distance). In some embodiments, a closest distance (e.g., nearest neighbor algorithm) is used. In some embodiments, a threshold distance is used such that one or more media items are selected within a threshold vector distance to the vector representation of the user (e.g., and that match search criteria determined from the request to search). In some embodiments, identifying the one or more media content items that match the vector representation of the user and the search criteria comprises applying a nearest neighbor heuristic to media content items in the media content library (e.g., those media items that match the search criteria).

The electronic device provides (530), to the user, the one or more media content items. For example, sequenced content items 413 are provided to electronic device 102 in response to the request to search 401, as described with reference to FIG. 4.

In some embodiments, the electronic device sequences (532) the one or more media content items from the media content library. In some embodiments, the identified one or more media content items are provided in a sequenced order (e.g., using ranking service 412, FIG. 4). In some embodiments, the items are sequenced according to scores produced as part of the identifying step 526. In some embodiments, the items are sequenced independently (e.g., without regard to the vector representation of the user and the search criteria). In some embodiments, the items are sequenced according to objectives and/or criteria distinct from the vector representation of the user and the search criteria.

In some embodiments, the system produces different candidate pools for multiple different users. To that end, in some embodiments, the system stores, for each respective user of a plurality of users of the media-providing service, a playback history that includes information about media items that have previously been consumed by the respective user. The system receives one or more request to search for media content including search criteria. In some embodiments, one request identifies multiple users, and a personalized pool is generated for each of the users. In some embodiments, separate requests are received for each user for which a personalized pool will be generated. The personalized pool comprises media items that match the query and are personalized to the user, as described with respect to method 500. To that end, for each user for whom a personalized pool is requested, in response to the request, and without user intervention, the system generates a vector representation of the user using media items from the playback history of the user that are relevant to the search criteria. The system identifies one or more media content items from a media content library that match the vector representation of the respective user and the search criteria and provides, to the user, the one or more media content items.

In this manner, the system may generate different pools of candidate media items for a "Lazy Sunday Mornings" playlist (e.g., wherein the search criteria include a criterion for "calm" media items); a "Get Pumped" exercise playlist (wherein the search criterion include a criterion for "energetic" media items); or a "Take me back to the 80s" playlist (wherein the search criteria include a criterion for music released between Jan. 1, 1980 and Dec. 31, 1989). After generating the personalized pools, in some embodiments, the playlists are sequenced according to playlist sequencing criteria (separate from the search criteria) and/or playlist objectives (also separate from the search criteria), and optionally without regard to any ranking generated by the search.

Accordingly, in response to the search request, the system provides search results that includes content items that are tailored to the user, by taking into account media content items that the user has consumed before that are relevant to the search request.

Additional Embodiments

The embodiments described below may be combined with and/or benefit from any of the operations or aspects of method 500, described above.

A method is performed at an electronic device (e.g., a server system). The method includes storing, for a user of a media-providing service, interaction data that includes information about media items with which the user has interacted. The method includes receiving a request to search for media content including search criteria. The method includes, in response to the request, and without additional user intervention, generating a vector representation of the user using the interaction data for the user. The method includes identifying one or more media content items from a media content library that match the vector representation of the user and the search criteria and providing, to the user, the one or more media content items.

In some embodiments, the request to search for media content is received from a module or microservice of a server system (e.g., the same or different server system that is performing the method). In some embodiments, the request to search is performed without user intervention as part of generating a personalized playlist that is recommended to the user. In some embodiments, the one or more media content items are identified prior to providing the recommendation to the user. In some embodiments, the one or more media content items are identified upon user selection of the recommendation.

Alternatively, in some embodiments, the search criteria are received from the user (e.g., in the form of a text string provided by the user).

Although FIGS. 5A-5B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:
   at an electronic device:
   storing, for a user of a media-providing service, a playback history that includes information about media items that have previously been consumed by the user;
   receiving a request to search for media content including search criteria;
   in response to the request, and without additional user intervention, generating a vector representation of the user using a subset, less than all, of the media items from the playback history of the user, wherein the subset, less than all, of the media items only includes media items from the playback history of the user that are relevant to the search criteria;
   identifying one or more media content items from a media content library that match the vector representation of the user and the search criteria, including selecting the one or more media content items based on respective vector distances between respective vector representations of the one or more media content items and the vector representation of the user; and
   providing, to the user, the one or more media content items.

2. The method of claim 1, wherein the playback history includes an indication of the media items that have previously been consumed by the user.

3. The method of claim 1, wherein the playback history includes, for a respective media item of the media items that have previously been consumed by the user, user interaction data representing one or more interactions, from the user, that are received by the media-providing service while the respective media item is consumed by the user.

4. The method of claim 3, wherein the user interaction data is based on one or more of: whether the user skipped playback of the media item within a predetermined time period, adjusted a volume of the media item, marked the media item as a favorite, added the media item to a playlist, and shared the media item.

5. The method of claim 3, wherein the user interaction data includes, for a respective media item, a positive indication value or a negative indication value.

6. The method of claim 1, wherein the playback history includes a number of times the media item was consumed by the user.

7. The method of claim 1, wherein the playback history includes an indication that the user repeated the media item.

8. The method of claim 1, further comprising, ranking the one or more media content items from the media content library.

9. The method of claim 1, wherein:
   the request to search for media content includes one or more descriptors, or synonyms of the one or more descriptors; and
   the method further comprises identifying the subset, less than all, of the media items, from the playback history of the user, that are relevant to the one or more descriptors.

10. The method of claim 1, wherein the request to search for media content comprises a voice command.

11. The method of claim 1, wherein the one or more media content items identified from the media content library include at least one media content item that is not in the playback history.

12. An electronic device, comprising:
   one or more processors; and
   memory storing one or more programs, the one or more programs including instructions for:
   storing, for a user of a media-providing service, a playback history that includes information about media items that have previously been consumed by the user;
   receiving a request to search for media content including search criteria;
   in response to the request, and without additional user intervention, generating a vector representation of the user using a subset, less than all, of the media items from the playback history of the user, wherein the subset, less than all, of the media items only includes media items from the playback history of the user that are relevant to the search criteria;

identifying one or more media content items from a media content library that match the vector representation of the user and the search criteria, including selecting the one or more media content items based on respective vector distances between respective vector representations of the one or more media content items and the vector representation of the user; and providing, to the user, the one or more media content items.

13. The electronic device of claim 12, wherein the playback history includes an indication of the media items that have previously been consumed by the user.

14. The electronic device of claim 12, wherein the playback history includes, for a respective media item of the media items that have previously been consumed by the user, user interaction data representing one or more interactions, from the user, that are received by the media-providing service while the respective media item is consumed by the user.

15. The electronic device of claim 14, wherein the user interaction data is based on one or more of: whether the user skipped playback of the media item within a predetermined time period, adjusted a volume of the media item, marked the media item as a favorite, added the media item to a playlist, and shared the media item.

16. The electronic device of claim 14, wherein the user interaction data includes, for a respective media item, a positive indication value or a negative indication value.

17. The electronic device of claim 12, wherein the playback history includes a number of times the media item was consumed by the user.

18. The electronic device of claim 12, wherein the playback history includes an indication that the user repeated the media item.

19. The electronic device of claim 12, wherein:
the request to search for media content includes one or more descriptors, or synonyms of the one or more descriptors; and
the one or more programs further include instructions for identifying the subset, less than all, of the media items, from the playback history of the user, that are relevant to the one or more descriptors.

20. A non-transitory computer-readable storage medium storing one or more programs for execution by an electronic device with one or more processors, the one or more programs comprising instructions for:
storing, for a user of a media-providing service, a playback history that includes information about media items that have previously been consumed by the user;
receiving a request to search for media content including search criteria;
in response to the request, and without additional user intervention, generating a vector representation of the user using a subset, less than all, of the media items from the playback history of the user, wherein the subset, less than all, of the media items only includes media items from the playback history of the user that are relevant to the search criteria;
identifying one or more media content items from a media content library that match the vector representation of the user and the search criteria, including selecting the one or more media content items based on respective vector distances between respective vector representations of the one or more media content items and the vector representation of the user; and
providing, to the user, the one or more media content items.

* * * * *